United States Patent [19]

Engström et al.

[11] Patent Number: 4,827,723
[45] Date of Patent: May 9, 1989

[54] INTEGRATED GAS TURBINE POWER GENERATION SYSTEM AND PROCESS

[75] Inventors: Folke Engström, San Diego, Calif.; Juhani M. Isaksson, Karhula, Finland

[73] Assignee: A. Ahlstrom Corporation, Karhula, Finland

[21] Appl. No.: 157,015

[22] Filed: Feb. 18, 1988

[51] Int. Cl.[4] .................. F01K 25/02; F01K 23/04; F02C 1/04
[52] U.S. Cl. ........................................ 60/683; 60/655; 122/4 D
[58] Field of Search ............... 60/650, 682, 683, 655; 122/4 D

[56] References Cited

U.S. PATENT DOCUMENTS

| | | | |
|---|---|---|---|
| 3,677,008 | 7/1972 | Koutz | 60/659 X |
| 4,312,301 | 1/1982 | Anson | 122/4 D |
| 4,369,624 | 1/1983 | Hamm et al. | 60/683 X |
| 4,406,128 | 9/1983 | Fanaritis et al. | 122/4 D |
| 4,479,355 | 10/1984 | Guide et al. | 60/683 |
| 4,503,681 | 3/1985 | Willyoung et al. | 60/683 X |
| 4,709,663 | 12/1987 | Larson et al. | 122/4 D |
| 4,755,134 | 7/1988 | Engstrom et al. | 122/4 D |

*Primary Examiner*—Allen M. Ostrager
*Attorney, Agent, or Firm*—Nixon & Vanderhye

[57] ABSTRACT

The system includes a circulating fluidized bed combustor coupled at its outlet to a separator. A vertical return channel is provided for conveying separated solid particles from the separator back to the combustion chamber. A gas turbine cycle is provided, including a gas compressor, a heat transfer means directed to a first duct to the compressor for heating the compressed oxidizing gas, a gas turbine connected through a second duct to the heat transfer means for power generation and a third duct for conveying expanded oxidizing gas from the turbine to the combustion chamber. The heat transfer means includes tubes disposed inside the vertical return channel for indirect heat transfer between the compressed gas and the dense suspension of separated particles flowing downwardly in the vertical channel.

12 Claims, 3 Drawing Sheets

INTEGRATED GAS TURBINE POWER GENERATION SYSTEM AND PROCESS

BACKGROUND OF THE INVENTION

This invention relates to an integrated gas turbine power generation system and process. It is more particularly concerned with an integrated power generation system wherein carbonaceous fuel is burned in a non-pressurized circulating fluidized bed combustor to provide heated gas for the gas turbine cycle and steam for the steam turbine cycle.

Conventional coal-fired power plants generating electrical power can produce thermal efficiencies of about 37–38% at the most, when the costs of current requirements for clean flue gases are taken into account. With integrated coal-fired gas turbine power plants, higher thermal efficiencies can be achieved. Processes with efficiencies as high as 40–41% as well as with low $NO_x$ and $SO_2$ emissions are well known.

A typical integrated power plant system includes a pressurized coal combustion system. A compressor provides pressurized air, 6–30 bar, into the combustor. The gas produced in the combustor is cleaned and employed to drive an expansion turbine. A waste heat boiler can be arranged for heat recovery after the turbine. The combustor includes a conventional steam generator to produce steam for driving a steam turbine electrical generator assembly.

The integrated power plants including pressurized coal combustion systems require an expensive and complicated construction. The coal feeding system is not easily arranged. The use of gas turbines is limited by the inability of the gas turbines to accept effluents from lower graded fuels. The high temperature effluents require complicated clean-up systems which increase costs. The turbine blades erode and foul as they are exposed to particulate matter not separated in the clean-up system.

Integrated plants which employ substantially atmospheric coal combustion systems are also known, such as those described in patent publications U.S. Pat. No. 4,326,373; U.S. Pat No. 4,406,128 and WO 82/00701.

U.S. Pat. No. 4,326,373 discloses an atmospheric coal combustion process in which the heat generated is recovered by air compressed in a hydraulic compressor and passed through air heaters (2) in the flue gas passage above the combustion chamber and through air heaters (4 in FIG. 1, U.S. Pat. No. 4,326,373) in the combustion chamber. The compressed and heated air is used for the production of work in a gas turbine. A heat exchanger (4) is exposed to extremely high corrosion/erosion. A heat exchanger (2) will be large and expensive due to inefficient heat transfer between flue gases and preheated air inside the tubes. Heat exchange rates between suspensions and tubes inserted in the suspension are dependent on the particle density of the suspension. In a fluidized bed, there are great variations in heat exchange at different heights in a fluidized bed combustion chamber. Maximum heat exchange can be achieved only in the lower part of the combustion chamber, in the dense zone of the bed.

The air heat recovery arrangements in the combustor can also easily cause disturbances in the combustion process and the overall process will be difficult to control. The temperature profile in the combustor will be affected by these extra heat exchange tubes disposed in the reactor. And furthermore as there already are heat transfer tubes for steam generation arranged in the reactor, it can be difficult to fit in any other tubes.

U.S. Pat. No. 4,406,128 discloses a combined cycle power plant utilizing a gas turbine for generating electric power. Carbonaceous fuel is burned in a non-pressurized fluidized bed combustor to provide energy for driving the gas turbine and generating steam. An external heat transfer unit through which a portion of the hot solids of the fluidized bed is circulated is used to heat clean compressed air. The heated compressed air is expanded in a gas turbine for the generation of electric power in a generator coupled thereto. The external heat transfer unit consists of an air heater chamber with inserted parallel tubes. A portion of hot solid particles from the fluidized bed is conveyed through these tubes with the aid of some fluidizing air. The clean compressed air passes into the air heater and around the outside surfaces of the tubes, extracting heat from them. The construction with an external heat transfer unit is liable to become space consuming and expensive. A uniform distribution of solid particles through the tubes as shown in FIG. 2 (U.S. Pat. No. 4,406,128) is extremely difficult due to enclosed construction as shown in FIG. 2, low volume rate of solid particles and large number of tubes required for the heat transfer. Furthermore, the air used to convey the solid particles will cool the solid mixture and reduce the temperature gradient between the solids and air on the outside surfaces of the tubes.

The use of additional fluidizing air in the air heater for conveying solid particles through the tubes and back into the combustion chamber has a negative effect on the overall performance of the combustor due to the power required to convey the solid particles. Surplus air or oxygen is not wanted into the combustor, neither into the air heater. In the air heater, air could cause carbonaceous solid particles to burn and so increase the temperature over the melting temperature of some of the solid particles and cause agglomeration of particles in the air heater with detrimental effects of the process. Sticky particles could also cause clogging of the tubes.

WO No. 82/00701 discloses a power generation plant with a recirculating fluidized bed furnace operating at a fluidization velocity of 10 m/s and delivering combustion products to a separating section. The solid particles from the separating section are led through a weir chamber to a second shallow fluidized bed. An air heater is disposed in the second fluidized bed space as well as tubes for steam generation, both tubes in different parts of the bed. The bed is operating at a lower fluidization velocity, 0.5 m/s, as is the bed in the furnace. The heated compressed air is supplied partly to a coal devolatilizer in the power generation system and partly to a burner which is connected to a gas turbine for generation of electrical power. This system has the same drawbacks as the previous one, the construction with a second fluidized bed is space-consuming and expensive. The additional air needed in the system to fluidize the second fluidized bed is a drawback and makes it more difficult to control the combustion process and hence the whole system. Compressed air needed to fluidize the bed is of course a cost in itself.

The use of a shallow fluidized bed is not advantageous as the hot fine ash particles tend to flow towards the top of the fluidized bed and the colder particles stay at the bottom of the bed. Consequently, the heat transfer in the bed deteriorates depending on the temperature profile developed in the bed.

It is an object of the present invention to provide an improved integrated gas turbine power generation system, utilizing a non-pressurized fluidized bed combustor to heat clean gas to the gas turbine without the drawbacks in previously mentioned power systems. Another object of the present invention is to provide an integrated gas turbine power generation system which is compact.

It is further an object of the present invention to provide an integrated gas turbine power generation process which has improved efficiency and is reliable and easy to control.

It is also an object of the present invention to provide a method of controlling the combustion temperature in the combustion chamber of a fluidized bed reactor.

According to the invention, there is provided an integrated gas turbine power generation system comprising a circulating fluidized bed combustor for the combustion of carbonaceous fuel at nearly an atmospheric pressure, and steam and gas turbine cycles. The combustor includes a combustion chamber section, a solid particle separator and a vertical return channel for conveying separated solid particles from the particle separator to the combustion chamber. The vertical return channel is connected with its upper end to the lower part of the particle separator and with its lower end to the inlet for solid recycled particles in the combustion chamber. The gas turbine cycle includes a gas compressor for compressing a flow of oxidizing gas, a heat transfer means connected through a duct to the compressor for heating the flow of compressed oxidizing gas, a gas expansion turbine connected through a second duct to the heat transfer means for power generation from the heated compressed oxidizing gas, and a third duct for leading expanded oxidizing gas from the gas turbine to the bottom of the combustion chamber. The heat transfer means for heating oxidizing gas includes heat exchange passages or tubes disposed inside the vertical return channel for leading compressed gas inside the passages or tubes in indirect contact with a relatively dense suspension of separated particles flowing evenly downwards outside the passages or tubes from the upper part of the channel to the lower part thereof. A process for generating power in such an integrated power system is also disclosed.

The present invention offers a compact circulating fluidized bed combustor with an air heater integrated into the circulation of solid material. The heat exchange passages or tubes are disposed in the vertical return channel where the solids density and consequently heat exchange rate is high. Due to high heat transfer rates, the heat exchanger can be built compact. Heat exchange in the vertical channel is uniform. By leading the solid material through the channel by gravitation, no auxiliary fluidizing air is needed differently from prior art fluidized heat exchangers. Therefore, the present invention offers a more uniform heat transfer process throughout the whole heat exchanger, without temperature profiles as in fluidized heat exchangers. The overall efficiency is increased when no pressurized gas/air is needed for the fluidization of hot particles. Besides production costs, fluidized air can have detrimental effects on hot particles such as burning or agglomeration of particles.

The invention makes it possible to control the temperature in the combustion chamber by controlling the temperature of recycled hot particles. The heat transfer from the hot particles in the vertical to the compressed air is affected by changes in the air flow or air pressure.

The major advantages of the invention compared with the conventional cogeneration system are higher power efficiency and potential to controlling the combustion temperature by extracting energy from the recirculation loop as the air used as working fluid in the gas turbine process also acts as combustion air in the boiler. The air flow rate should be controlled to correspond to the boiler load, i.e., 30–100%. The utilization of air as working fluid in the gas turbine process is simple and reliable, no gas cleaning is needed.

As steam generation tubes are already fully disposed in the boiler, it is advantageous to be able to control the temperature profile of the boiler without still trying to increase the amount of heat transfer means in the boiler itself.

These and further objects and advantages of the present invention will become more apparent upon reference to the following specification, appended claims and drawings.

BRIEF DESCRIPTION OF THE DRAWING FIGURES

DETAILED DESCRIPTION OF THE DRAWING FIGURES

Reference will now be made in detail to the present preferred embodiment of the invention, an example of which is illustrated in the accompanying drawings.

Figure 1:
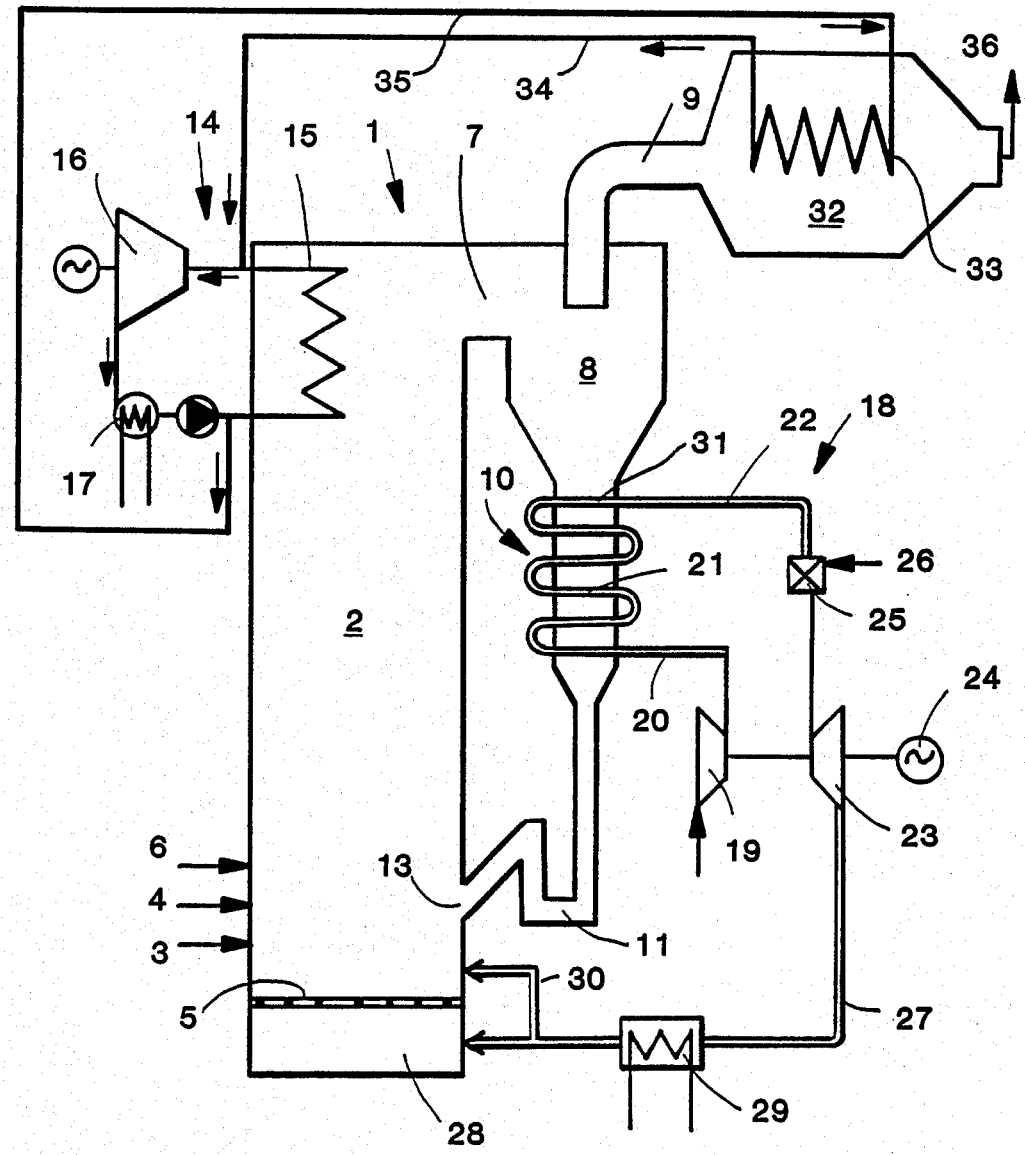
FIG. 1 shows a circulating fluidized bed combustor with steam and gas turbine cycles. The solid particle separator is a vertical cyclone.

A preferred embodiment of the present invention is shown in FIG. 1, where carbonaceous solid material is combusted in a circulating fluidized bed combustor 1. The combustor includes a combustion chamber 2 with inlets 3, 4 for solid fuel material and eventual other solid materials such as lime or dolomite for the reduction of $SO_2$ in the flue gases. The fluidizing air and oxidizing air is led into the combustion chamber through a bottom plate 5 with openings for the air. The air is led into the reactor at nearly an atmospheric pressure at a flow rate high enough to fluidize the bed and entrain a portion of the solid particles. Secondary air can be led into the combustion chamber through an inlet 6 above the bottom plate.

The combustion chamber has an outlet 7 for combustion gases containing entrained solid particles. The combustion gases are led to a cyclone separator 8 where the solid particles are separated from the gases. The cleaned gas is discharged through an outlet pipe 9 and the solid particles are led downwards through a vertical channel 10 back into the combustion chamber. The channel forms a bend 11 at its lower end in front of the inlet 13 to the combustion chamber.

A steam turbine cycle 14 is integrated with the combustion chamber. First, heat transfer means 15 for steam generation are disposed inside the combustion chamber. A steam turbine 16 is connected to the heat transfer tubes for power generation. The steam is condensed in a heat recovery condensor 17 and circulated back into the heat transfer tubes in the combustion chamber with a high pressure pump.

A gas turbine cycle 18 is integrated with the circulating fluidized bed system. Air is compressed in a compressor 19 to about 5-15 bar and led through a first duct 20 into a second heat transfer means 21 in the vertical channel 10, where the air is heated to 500-900° C., preferably to 650-850° C. The solids density in the vertical channel is about 50-1000kg/m$^3$ which gives a very good heat transfer rate. From the heat exchanger 21, the compressed and heated air is led to a gas turbine 23 through a duct 22. The air is expanded and produces electrical power through a generator 24. An additional heater 25 can be used to increase the temperature of the gas to 1000-1100° C. The heater can be a burner using oil or gas 26.

The expanded clean air is led through a third duct 27 mainly into an air chamber 28 under the bottom plate 5 in the combustion chamber 2. The temperature of the air is about 300-450° C. if no additional heater is used and about 500-650° C. if the additional heater is used to heat air before the turbine. If the temperature of the expanded air is too high, a heat exchanger can be connected to the third duct. It is also possible to lead the hot air from the gas turbine to a location 30 above the bottom plate.

The heat exchanger 21 preferably consists of bent ceramic tubes 31 which have a good heat transfer rate and are resistant even in high temperature applications. Of course, tubes of resistant metal alloys can be used as well. The tubes have preferably a diameter of 50-200 mm.

The tubes 31 are preferably disposed horizontally in the channel 10 and are connected to each other and to the first and second ducts, 20, 22 through feeders outside the channel 10. Straight tubes can be used if metal couplings outside the channel are used to connect the tubes to each other. In some applications, vertically disposed tubes could be used as well.

The air passages 21 in the heat exchanger are preferably tubes but channels between e.g., ceramic plates could be used as well as heat exchange between air and solid particles.

The cleaned gases discharged through outlet pipe 9 are passed to a heat recovery boiler 32. A heat exchanger 33 in the recovery boiler is connected to the steam turbine cycle 14 through ducts 34 and 35. The cleaned and cooled gas is discharged to stack through duct 36.

Figure 2:
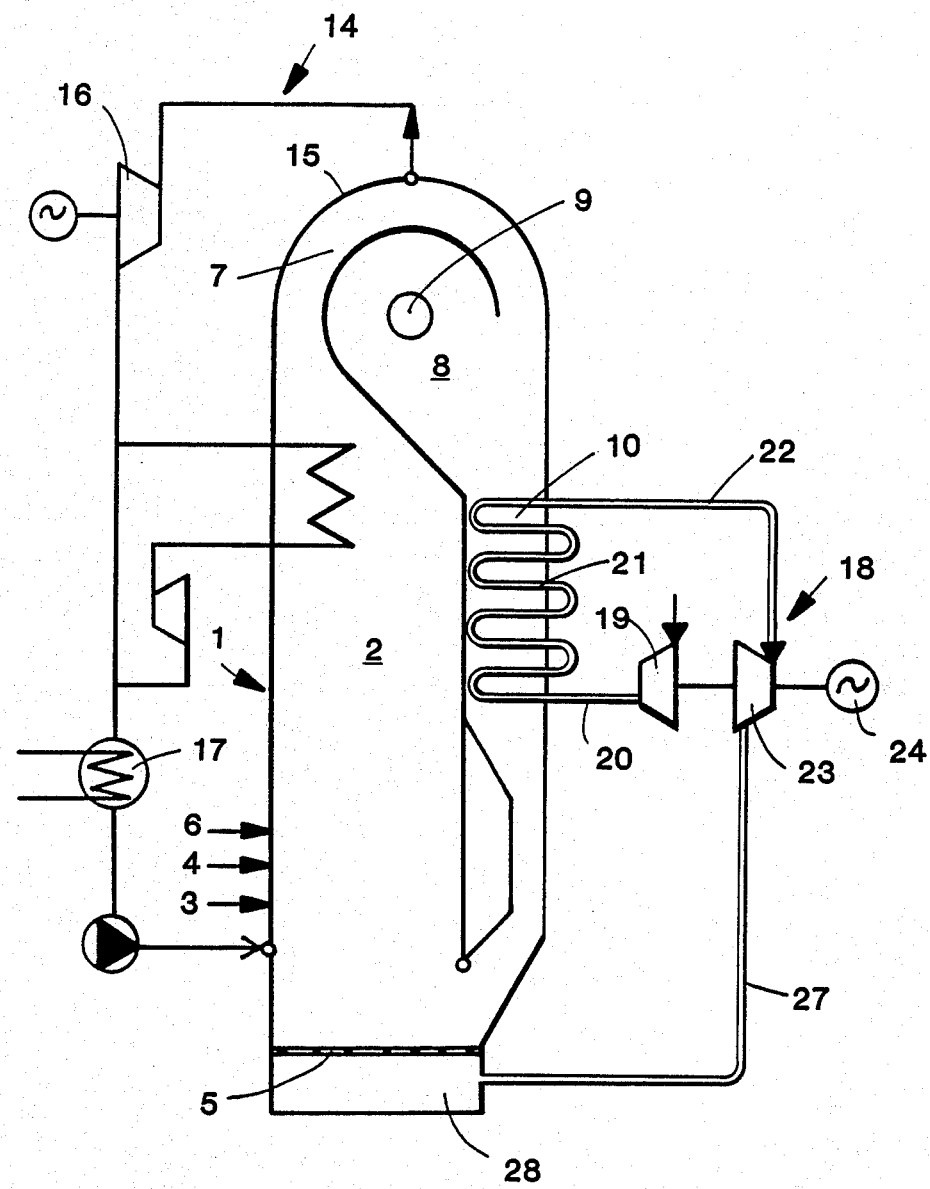
FIG. 2 shows another circulating fluidized bed combustor with steam and gas turbine cycles. The solid particle separator is a horizontal cyclone.

A second embodiment is shown in FIG. 2. The same reference numbers are used as in FIG. 1. A horizontal cyclone 8 is used instead of a vertical cyclone to separate solid particles from the combustion gases. This enables a combustor design which is even more compact that what is shown in FIG. 1. The first heat transfer means 15 consists of tubewalls in the combustion chamber connected to the steam cycle.

EXAMPLE

Tests have been performed to calculate thermal efficiencies in power generation systems according to the invention. Polish coal with a lower heating value of 28,800 kJ/kg/d.s. was burned in the combustor. The air inlet temperature was 15° C. and the flue gas outlet temperature was 120° C. Air flow was 98.2 kg/s. The polytropic efficiency of the compressor used was 0.9 and of the gas turbine 0.8. Pressure drop over the heat exchanger was 0.02 bar and over the combustion chamber 0.1 bar. 44.06% of the heat transferred to steam was converted to steam turbine power.

| $T_1$ °C. | $T_3$ °C. | $T_4$ °C. | therm. power of heat ex. MW | steam. t. power MW | gas.t. power MW | therm. eff. % | opt.pres. ratio of compr. bar |
|---|---|---|---|---|---|---|---|
| 280 | 850 | 486 | 62,3 | 97,5 | 14,1 | 44.6 | 8,1 |
| 265 | 800 | 463 | 58,2 | 98,3 | 12,3 | 44.2 | 7,4 |
| 249 | 750 | 715 | 54,1 | 99,0 | 10,6 | 43.8 | 6,7 |
| 234 | 700 | 442 | 50,0 | 99,7 | 8,9 | 43.5 | 6,1 |
| 218 | 650 | 396 | 46,1 | 100,4 | 7,4 | 43.1 | 5,5 |
| 201 | 600 | 374 | 42,3 | 101,1 | 5,9 | 42.8 | 4,9 |
| 185 | 550 | 350 | 38,4 | 101,7 | 4,6 | 42.5 | 4,4 |

Figure 3:
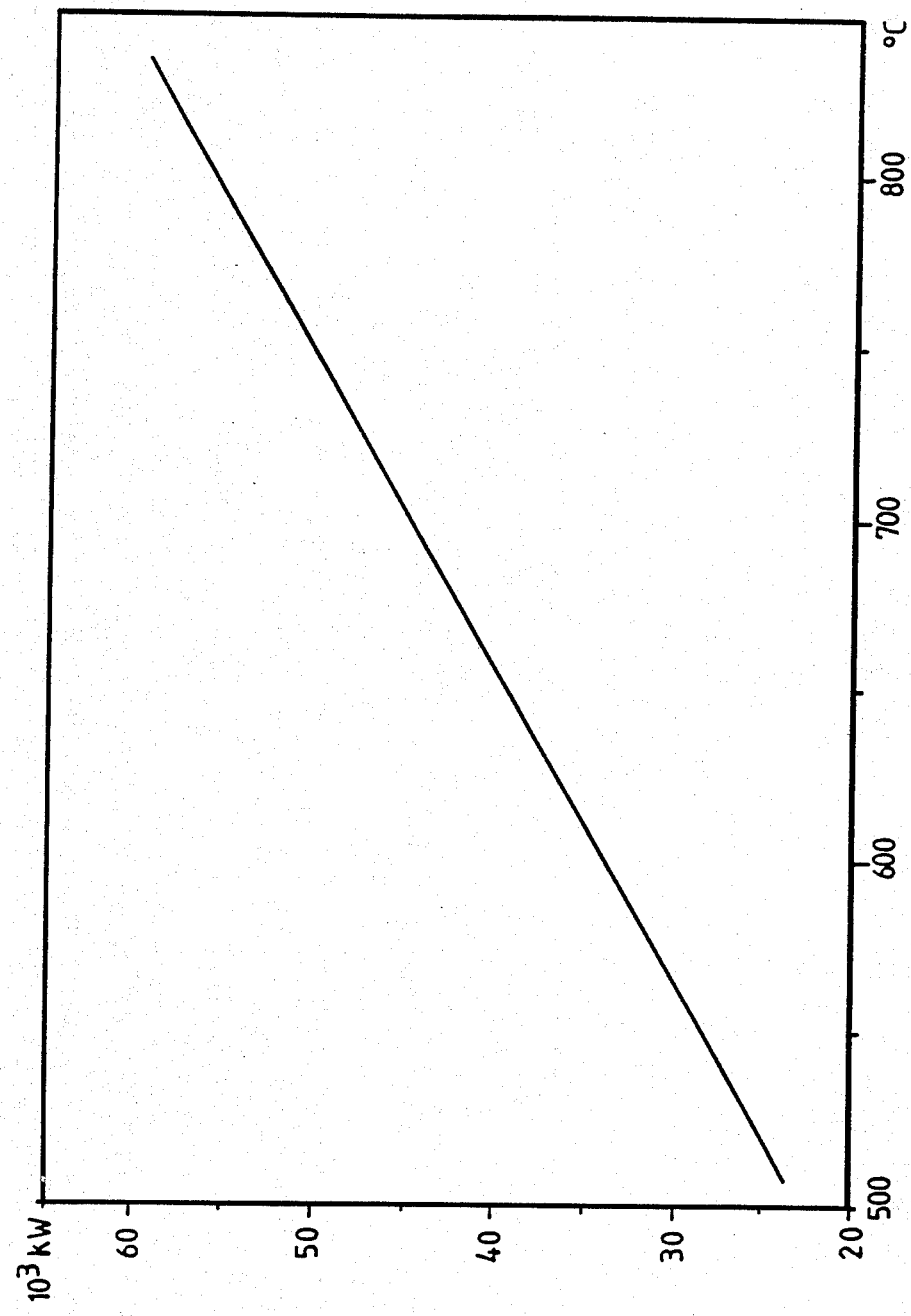
FIG. 3 shows the relation between heat exchanger power and temperature.

$T_1$ = temperature after the compressor
$T_3$ = temperature at inlet to the gas turbine
$T_4$ = temperature after the gas turbine In FIG. 3, the heat exchanger power is shown in relation to the temperature before the gas turbine. Heat transfer from hot particles to tubes in the vertical channel is about 400 W/m$^2$/°K.

The thermal efficiency is clearly increasing when the temperature of air is increased due to indirect heating with hot recycling particles in the vertical return channel.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A power generation system comprising:
    a circulating fluidized bed reactor including a combustion chamber, a particle separator connected to the outlet for combustion gases in the combustion chamber, and a substantially vertical channel, disposed between the lower end of the particle separator and the lower end of the combustion chamber, for conveying separated solid particles from the particle separator back into the combustion chamber;
    a gas turbine cycle including a gas compressor for compressing oxidizing gas, a heat transfer means for heating the compressed gas from the compressor, and a gas turbine connected through a duct to the heat transfer means, said heat transfer means including heat exchange passages disposed inside said substantially vertical channel for leading the compressed gas inside said passages in indirect contact with particles separated in the particle separator and flowing by gravity downwards outside said passages in a closed system without additional fluidization from the upper part of the channel to the lower part of said channel; and
    a duct leading expanded oxidizing gas from the gas turbine to the lower part of the combustion chamber.

2. A power generation system according to claim 1, including a steam turbine section having a steam turbine and a second heat transfer means for generating steam disposed inside said combustion chamber.

3. A power generation system as in claim 2 wherein the first mentioned heat transfer means include horizontal tubes.

4. A power generation system as in claim 2 wherein the first mentioned heat transfer means include vertical tubes.

5. A power generation system as in claim 2 wherein the first mentioned heat transfer means include ceramic tubes.

6. A power generation system as in claim 2 wherein the oxidizing gas is compressed to 5–15 bar.

7. A power generation system as in claim 2 wherein gas is heated to 500–900° C. in the first heat exchanger.

8. A power generation system as in claim 7 wherein the oxidizing gas is heated to about 650–850° C.

9. A power generating system as in claim 2 wherein an additional heater is disposed ahead of the gas turbine for heating the oxidizing gas.

10. A power generation system as in claim 9 wherein a gas or oil burner is disposed ahead of the gas turbine for heating the gas to 800–1100° C.

11. A power generating system as in claim 2 wherein the solid particle separator is a vertical cyclone separator.

12. A power generating system as in claim 2 wherein the solid particle separator is a horizontal cyclone separator.

* * * * *